(No Model.)  2 Sheets—Sheet 1.

W. R. PARKER.
CORN CRIB RAT TRAP.

No. 387,439.  Patented Aug. 7, 1888.

WITNESSES:
Fred G. Dieterich
P. B. Turpin

INVENTOR,
W. R. Parker
BY Munn & Co
ATTORNEY.

(No Model.) 2 Sheets—Sheet 2.

W. R. PARKER.
CORN CRIB RAT TRAP.

No. 387,439. Patented Aug. 7, 1888.

WITNESSES:
Fred G. Dieterich
P. B. Turpin

INVENTOR.
W. R. Parker
BY Munn & Co.
ATTORNEY.

UNITED STATES PATENT OFFICE.

WILLIAM R. PARKER, OF MUDDY CREEK FORKS, PENNSYLVANIA.

CORN-CRIB RAT-TRAP.

SPECIFICATION forming part of Letters Patent No. 387,439, dated August 7, 1888.

Application filed April 9, 1888. Serial No. 270,029. (No model.)

*To all whom it may concern:*

Be it known that I, WILLIAM R. PARKER, of Muddy Creek Forks, in the county of York and State of Pennsylvania, have invented a new and useful Improvement in Corn-Crib Rat-Traps, of which the following is a specification.

My invention is an improvement in rat-traps designed especially for use in connection with corn-cribs; and the invention consists in certain novel constructions and combinations of parts, as will be hereinafter described and claimed.

Figure 1:
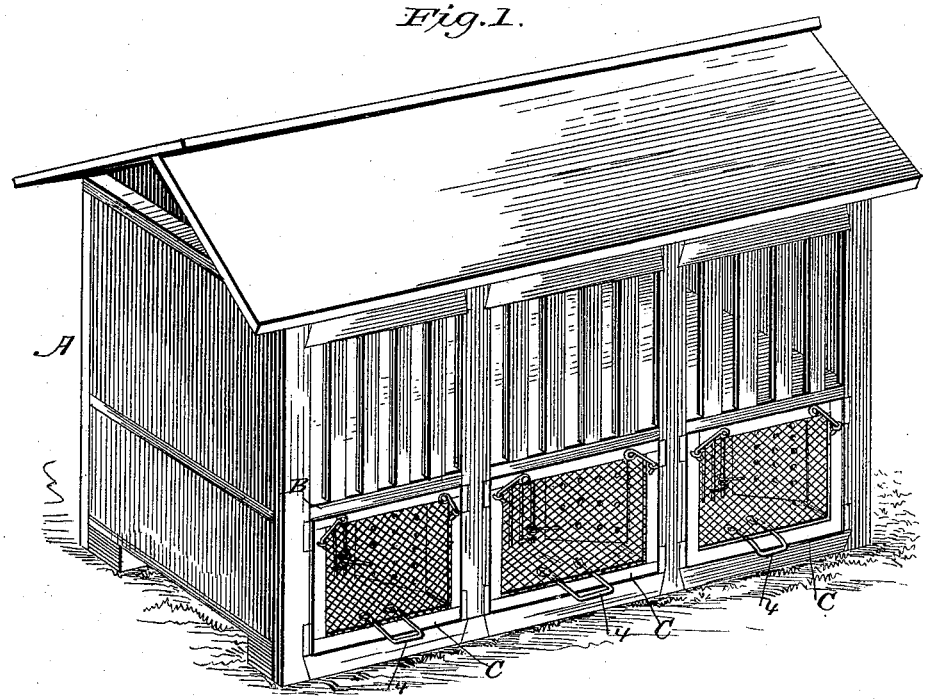
Figure 2:
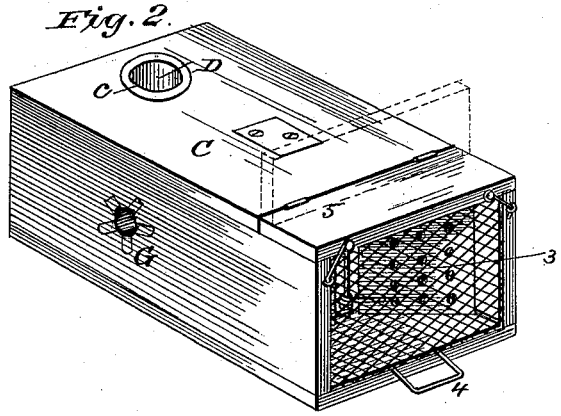
Figure 3:
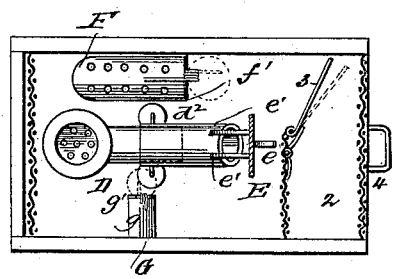
Figure 4:
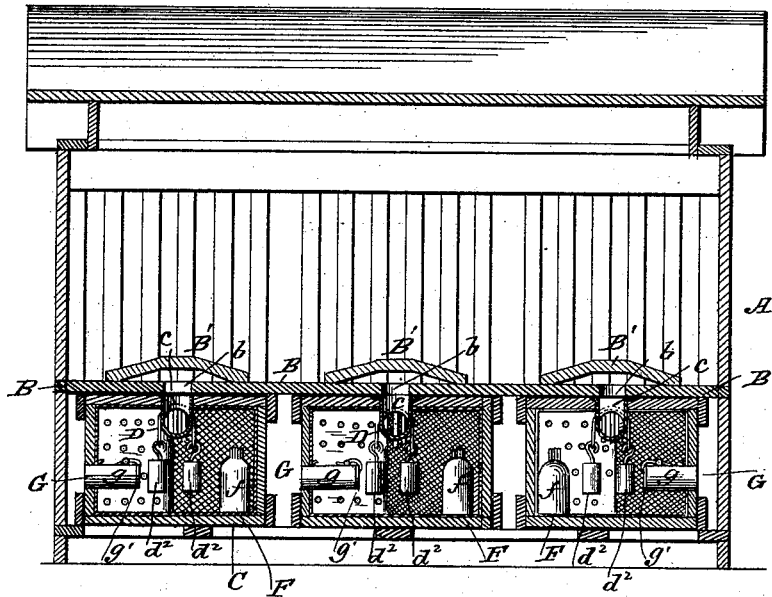
Figure 5:
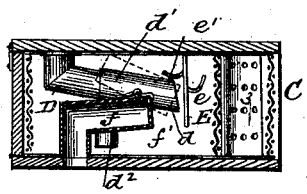
Figure 6:
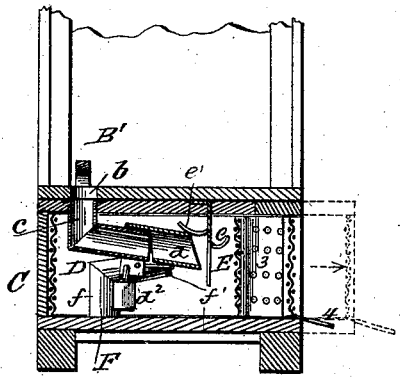
Figure 7:
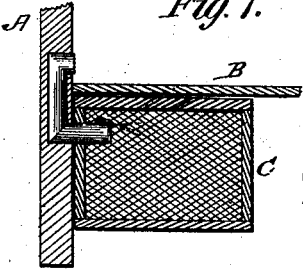

In the drawings, Figure 1 is a perspective view of my invention as in use. Fig. 2 is a detail view of the trap-box. Fig. 3 is a top plan view of the trap-box, its top plate being removed. Fig. 4 is a vertical longitudinal section drawn through the top inlet and through the flooring and part of the framing of the crib. Fig. 5 is a longitudinal section drawn through the lower inlet. Fig. 6 is a cross-section drawn through one of the trap-boxes and part of the flooring and framing of the crib, and Fig. 7 shows the tube seated in one of the framing-posts.

The crib A is constructed in general respects in any suitable manner, having framing, the slatted sides, the roof, and the floor B. From the corn-chamber openings $b$ are formed, preferably extending directly through the floor B and being protected by guards B', looped over them and serving to prevent the corn from passing into or over the said openings in such manner as to clog them. While the arrangement of the outlet-opening through the floor is preferred, that shown in Fig. 7 may be used when desired, and consists in forming the outlet-opening through the post of the crib-framing leading into the trap-box, presently described, protector-guard $b'$ being provided above said opening.

The trap box or boxes are supported in guides provided in the crib-framing below the floor thereof and have their tops movable close to and against the under side of the crib-floor, so that the openings $c$ in the top of the boxes C may be registered with the opening $b$ through floor B. As these trap-boxes are alike, the description of one will answer for all.

As shown in the drawings, the box has its top formed with the opening $c$ communicating with a tube, D, which has at its inner end a drop-tube, $d$, pivoted to the tube D, and having an extension, $d'$, in rear of its pivot, weighted at $d^2$, so as to hold the tube $d$ normally in line with the lower portion of the tube D, and yet to be depressed by the weight of a rat passing onto it, so the rat will be discharged onto the floor of the box, as will be clearly understood from Fig. 5. In front of the movable end of the tube $d$ and near thereto I arrange the guard-plate E, which has the bait-hook $e$ on one side, and has at its opposite side a stop projection or projections, $e'$, extended above and arranged to limit the downward movement of tube $d$.

The tubes D $d$ and guard-plate E form a check-guarded inlet to the box. I also provide check-guarded inlets F G through respectively the bottom and side of the box-tubes $f$ $g$, leading from the inlet-openings, and spring cover plates $f'$ $g'$ provided at the inner ends of said tubes, and arranged as shown, whereby the rats may pass into the box, but cannot pass back out of said tubes.

The box is divided into compartments 1 and 2, and the several check-guarded inlets open into the compartment 1, such compartment being partitioned from compartment 2, and a spring-actuated check-gate, 3, being provided to control the passage-way between compartments 1 and 2, so the rats may freely pass into compartment 2, but cannot return therefrom to the compartment 1. The outer end of compartment 2 is covered by wire or other suitable net-work, and the light resulting therefrom serves to attract the rats, mice, &c., from compartment 1 to compartment 2, the outer end of compartment 1 being closed and it being thereby darkened as compared with compartment 2.

It will be seen from the foregoing that whether the rats be attempting to pass into or from the corn-chamber of the crib they will be directed into the trap-box, passing first into the compartment 1 and thence into compartment 2. I provide this latter with a door or gate, 5, which may be opened to remove the rats or mice.

Manifestly the trap-box may be removed and used in the house or barn without involving any departure from some of the broad principles of my invention. In use it will be seen that the trap box or boxes slide in ways or guides below the floor of the crib, and have a handle, 4, so they can be drawn out. Ordinarily it is only necessary to draw the box out far enough to open the door 3.

Where the boxes are made of wood I usually line them with tin, sheet-iron, or other suitable metal.

Having thus described my invention, what I claim as new is—

1. The combination of the crib having a corn-chamber provided below the floor of said chamber with a way for the trap-box and having an opening leading from the corn-chamber and intersecting the way for the trap-box, such opening being adapted to permit the passage of the vermin, and the trap-box fitted to said way and movable therein into and out of position below the floor of the corn-chamber and having an inlet-opening movable into and out of register with the opening leading from the corn-chamber, substantially as and for the purposes specified.

2. The combination of the crib having a corn-chamber provided below the same with a way for the trap-box and having an opening adapted to permit the passage of the vermin, such opening leading from the corn-chamber and intersecting the way for the trap-box, and the trap-box fitted to said way and movable into and out of position below the corn-chamber and provided with an inlet-opening movable into and out of register with the opening leading from the corn-chamber, and such trap-box also having a check-guarded inlet-opening leading into it from without the corn-chamber, substantially as and for the purposes set forth.

3. The combination of the corn-crib having a corn-chamber and provided below the same with a way for the trap-box, and having an opening leading from said corn-chamber and intersecting said way, and the trap-box movable in said way into and out of position below the corn-chamber and having in its top an inlet-opening which may be adjusted into register with the opening from the corn-chamber, and check-guarded inlet-openings being provided through the bottom and side of such box, substantially as set forth.

4. The combination of the crib having a corn-chamber provided with an opening leading from said chamber and having within said chamber a guard extended over the said opening, and the trap-box movable into and out of position below the corn-chamber and having an inlet-opening which may be adjusted into register with the opening leading from the corn-chamber, substantially as set forth.

5. The combination of the trap-box, the tube D, the pivoted drop-tube $d$, and the guard-plate E, arranged in front of the inner end of tube $d$ and having stop projection $e'$ on its side next the said tube $d$ and a hook, $e$, on its opposite side, substantially as set forth.

WILLIAM R. PARKER.

Witnesses:
 JOHN H. STEWART,
 STEPHEN W. CUNNINGHAM.